June 8, 1926.

A. A. JUELFS 1,587,777

ROLLER BEARING SLEEVE PULLER

Filed August 11, 1924

Inventor
Allen A. Juelfs

Witness
John Milton Jester

Attorney

Patented June 8, 1926.

1,587,777

UNITED STATES PATENT OFFICE.

ALLEN A. JUELFS, OF McPHERSON, KANSAS.

ROLLER-BEARING-SLEEVE PULLER.

Application filed August 11, 1924. Serial No. 731,396.

This invention relates to tools intended for use by automobile mechanics and others and has for its object the provision of a novel lever actuated device for effecting extraction or pulling of the roller bearing sleeve located at the outer end of the rear axle housing.

It is well known that the ends of the axle housing contain sleeves within which the roller bearings are located and in the course of time these sleeves become worn to such an extent that play results causing wabbling of the rear wheels and strain on the differential gearing and other parts. These sleeves are split and are formed with holes. Ordinarily it is quite a difficult matter to remove these sleeves unless some special tool is provided.

It is with the above facts in view that I have designed the present tool which may be used while the axle is in place and which is so constructed and arranged that an efficient purchase may be obtained for giving the necessary leverage to effect extraction, the device being, moreover, provided with a plurality of fulcrum points so that a new hold may be obtained after the sleeve is partly withdrawn.

An additional object is the provision of a device of this character which will be simple and inexpensive in manufacture, easy to use, a great time and labor saver, and a general improvement in the art.

With the above and other objects and advantages in view, the invention consists in the combination and arrangement of parts to be hereinafter more fully described and claimed and illustrated in the accompanying drawings in which:

Figure 1:
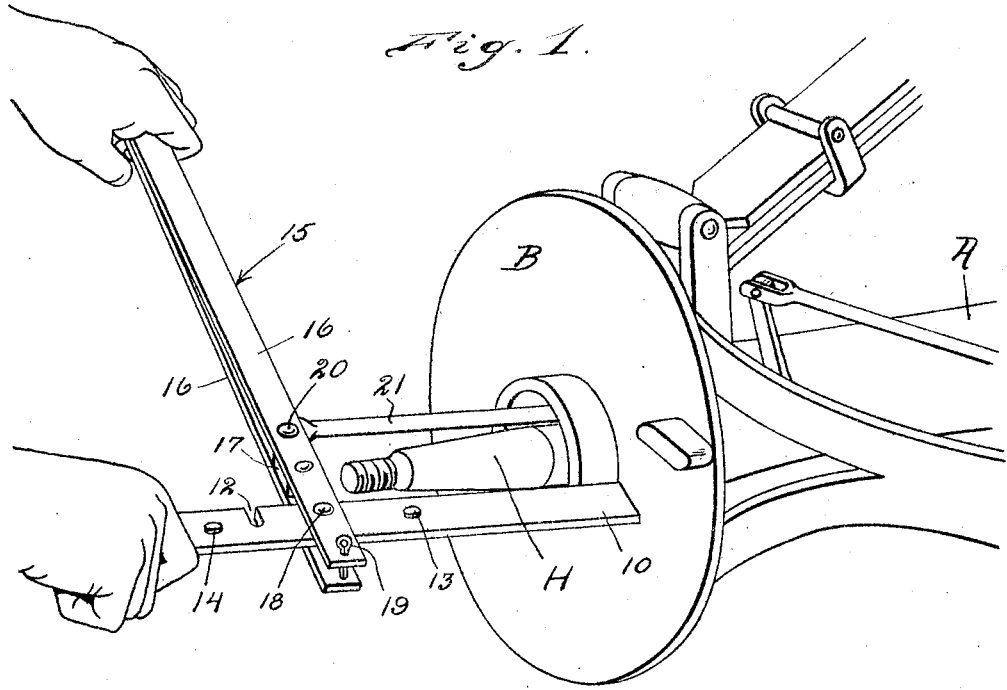
Figure 1 is a perspective view of one end portion of the rear axle structure of a motor vehicle showing the tool in use.

Referring more particularly to the drawings, the letter A designates a portion of the rear axle housing of a motor vehicle, at the end of which housing is mounted the disk-like supporting structure B which carries the emergency brake shoes, not shown. This element B includes a hub portion C which is riveted at D onto the housing A and mounted within this hub portion is the roller bearing sleeve E having a split F and provided with a hole G. The letter H designates the axle or spindle between which and the sleeve E the roller bearings, not shown, are disposed, which bearings are contained within a suitable cage which may be easily withdrawn from within the sleeve.

In carrying out my invention I provide a fulcrum post formed as a bar 10 of suitable dimensions and of any desired material, which bar is formed at one edge with spaced notches 11 and 12. At opposite sides of the notches are stop projections 13 and 14 which might be rivets if preferred. In connection with this bar I make use of a lever designated broadly by the numeral 15 and here shown as formed of two bars 16 held in spaced relation by a block 17 riveted, welded, or otherwise secured in place so that the end of the lever is in effect forked or bifurcated. This forked end of the lever is engaged upon the bar 10 and is provided with a rivet 18 extending across the same and adapted to be engaged within either of the notches 11 or 12 whereby to obtain a fulcrum or purchase point. Traversing the forked end of the lever is a cotter pin or the like 19 which is for the purpose of preventing disassociation of the lever from the bar 10, and movement of the lever longitudinally of the bar is limited by the stop projections 13 and 14.

Pivoted at 20 between the bars 16 of the lever 15 is a rod 21 terminating in a hook 22 and of such size and formation as to be capable of insertion within the space between the spindle or axle and the sleeve.

Figure 2:
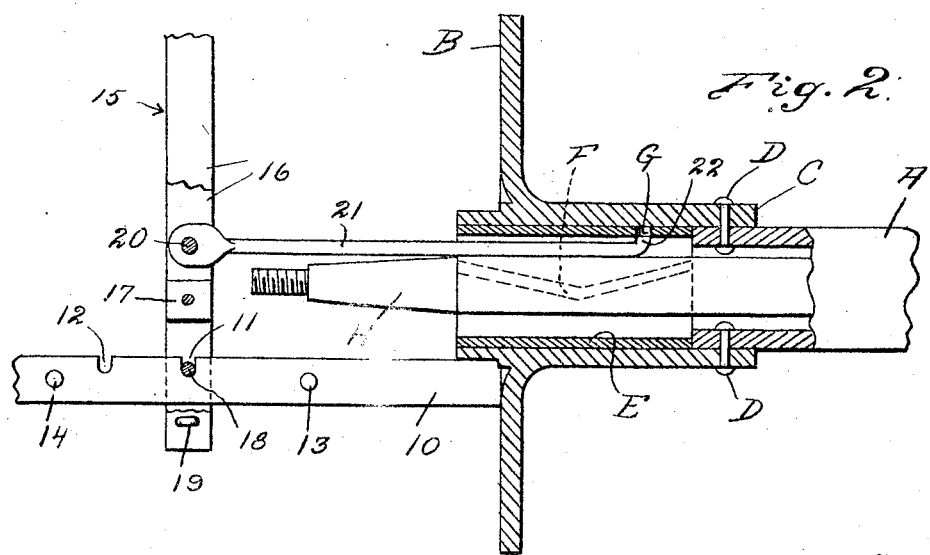
Figure 2 is a longitudinal section through the end portion of the housing and illustrating the tool in place.

In the use of the device, the rod 21 is inserted between the spindle and sleeve and the bar 10 is disposed against the outer face of the element B at the projecting end of the hub portion C as shown in Figure 2. The rivet 18 is engaged within the notch 11 and the rod 21 is moved laterally to cause the hook 22 to enter the hole G in the sleeve. The operator then holds the end of the bar 10 in one hand, grasps the free end of the lever 15 with the other hand, as shown in Figure 1, and then pulls outwardly on the lever. The rivet 18 fulcrums within the notch 11 and it is apparent that a powerful leverage is exerted which, pulling upon the rod 21, will result in pulling the sleeve E outwardly with respect to the axle housing. After the sleeve has been partly withdrawn, it may be necessary or at least preferable to move the bar 10 laterally to permit disengagement of the rivet 18 from the notch 11, after which the lever may be so disposed that the rivet 18 thereon will engage within the notch 12, after which the pulling action is repeated to effect entire withdrawal of the sleeve. The provision of the two notches has the additional advantage of possibly permitting the device to be used for extracting the sleeves on different makes or types of vehicles as there is an adjustment of the fulcrum point.

From the foregoing description and a study of the drawing it will be apparent that I have thus provided a highly efficient, easily operated, and rapidly acting tool for the purpose specified which will effectually perform all the functions for which it is intended and which, on account of the fewness of parts and ruggedness of construction, should have a long and satisfactory life.

While I have shown and described the preferred embodiment of my invention, it is of course to be understood that I reserve the right to make such changes in the form, construction and arrangement of parts as will not depart from the spirit of the invention or the scope of the subjoined claims.

I claim:

1. A roller bearing sleeve puller comprising a fulcrum post provided with a series of fulcrum points, a lever having its end portion straddled upon the post and carrying means engageable with a selected fulcrum point, and a rod pivoted upon the lever at a point spaced inwardly from the post and terminating in a hook, the post being adapted for abutting engagement at its end with the end of an axle housing, and said rod being capable of insertion within the space between an axle spindle and a roller bearing sleeve surrounding the same with the hook adapted for engagement within a hole in the sleeve, the lever being swingable outwardly to extract the sleeve.

2. In a device of the character described, an elongated bar constituting a fulcrum post and formed with a series of notches at one edge constituting selectively and successively usable fulcrum points, a lever straddled upon the bar and including a transverse element engageable within a selected notch, and a rod pivoted on the lever and terminating in a hook.

3. A device of the character described comprising an elongated bar constituting a fulcrum post, the bar being formed with a series of notches defining fulcrum points, a lever of forked formation straddled upon the bar, means traversing the lever outwardly of the bar for preventing disassociation, an element traversing the lever and engageable within a selected notch, and a rod pivoted within the lever and terminating in a hook.

4. A device of the character described comprising an elongated bar constituting a fulcrum post, the bar being formed with a series of notches defining fulcrum points, a lever of forked formation straddled upon the bar, means traversing the lever outwardly of the bar for preventing disassociation, an element traversing the lever and engageable within a selected notch, a rod pivoted within the lever and terminating in a hook, and stops on the bar at opposite sides of the series of notches for limiting movement of the lever longitudinally of the bar.

In testimony whereof I hereto affix my signature.

ALLEN A. JUELFS.